Sept. 21, 1943.     R. H. TERRY ET AL     2,329,862
APPARATUS AND PROCESS FOR TREATING METAL POWDERS
Filed Oct. 16, 1940
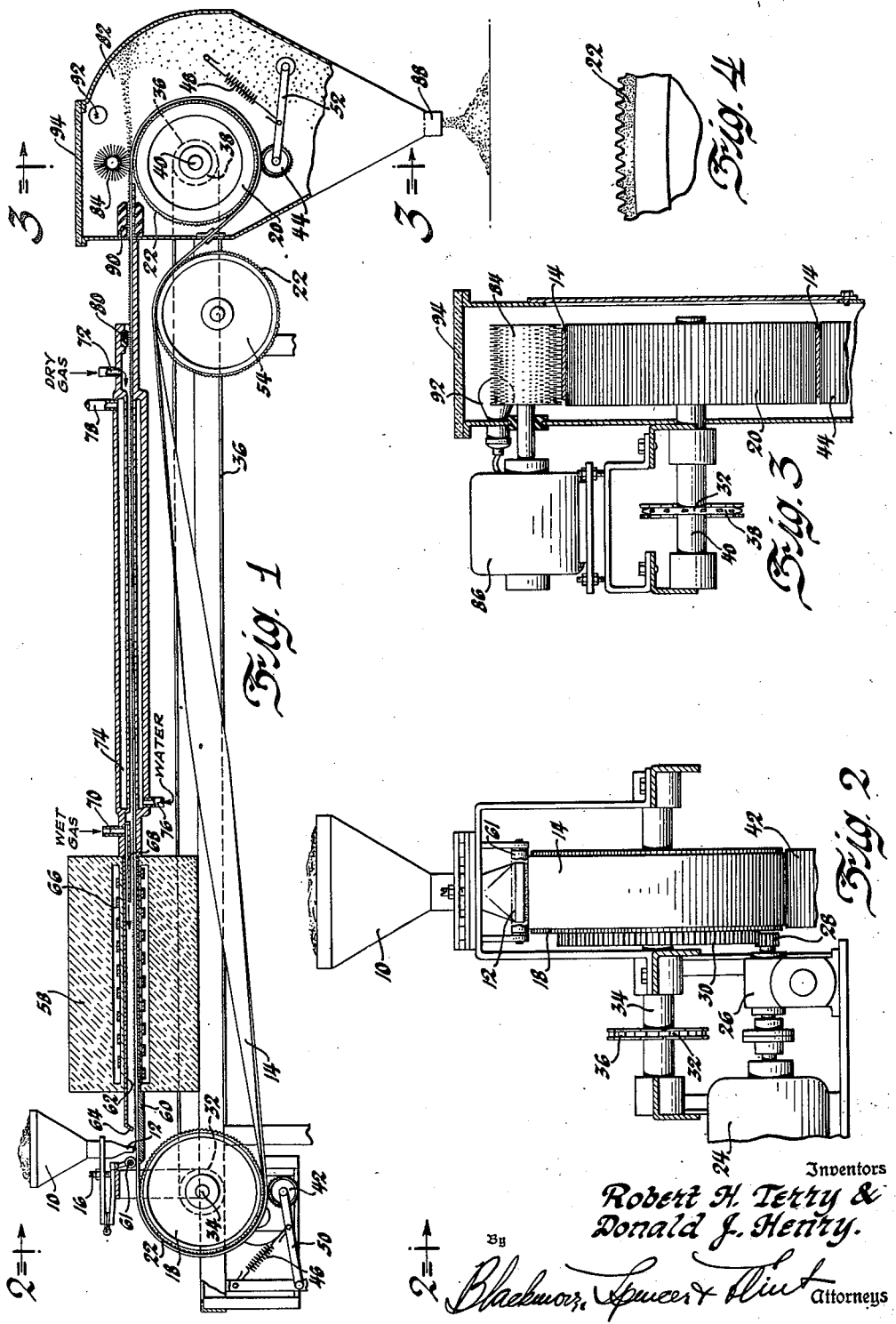
Inventors
Robert H. Terry &
Donald J. Henry.
By
Blackmore, Spencer & Flint
Attorneys Patented Sept. 21, 1943

2,329,862

UNITED STATES PATENT OFFICE 2,329,862

APPARATUS AND PROCESS FOR TREATING METAL POWDERS

Robert H. Terry and Donald J. Henry, Detroit, Mich., assignors to General Motors Corporation, Detroit, Mich., a corporation of Delaware Application October 16, 1940, Serial No. 361,400

8 Claims. (Cl. 148—16)

This invention has to do with an apparatus and process for treating powdered metals and more particularly it relates to a process and apparatus for decarburizing and/or deoxidizing iron powder containing carbon or oxygen combined therewith.

One object of this invention is to provide improvements in an apparatus for, and process of, treating metal powders.

Another object of this invention is to provide improvements in an apparatus for, and process of, decarburizing iron powder.

Still another object of this invention is to provide a convenient and practical continuous process of decarburizing iron powder.

It is also an object of this invention to provide improvements in apparatus for continuously processing metal powder.

A further object of this invention is a method of producing powder of a high degree of purity that is especially adapted for use in the formation of briquetted and sintered articles.

Other objects and advantages of the present invention will become more apparent as the description proceeds.

Reference is herewith made to the accompanying drawing illustrating one embodiment of an apparatus constructed in accordance with the present invention.

In the drawing:

Figure 1 is a side elevational view of the apparatus, with parts in section.

Figure 2 is a view taken on line 2—2 in Figure 1.

Figure 3 is a view taken on line 3—3 in Figure 1.

Figure 4 is a detail view.

General description

In general the device illustrated consists of an endless metallic belt on which the powder to be processed is spread automatically. The belt with the powder thereon is passed through a suitable furnace maintained at a suitable temperature. A reducing atmosphere is maintained within the furnace. The belt and powder thereon are then slowly cooled under non-oxidizing conditions as they leave the discharge end of the furnace. The treated powder is then removed from the belt, preferably by means of a revolving wire brush.

Detailed description

At the left end of Figure 1 is a suitable hopper 10 filled with the powder to be processed. The hopper has a narrow discharge outlet 12 extending across the major portion of the width of an endless metal conveyor belt 14. A suitable adjusting means 16 is provided in order to raise or lower the outlet 12 so that the thickness of powder can be increased or decreased. In the form shown the powder flows onto the belt by means of gravity. Preferably the belt is formed of a heat resistant alloy. Various heat resistant nickel-chromium alloys may be used.

The belt is driven by means of the pulleys 18 and 20. The pulleys have a suitable friction surface so that the metal belt will not slip. A corrugated rubber portion 22 has been used with success, although obviously many other shapes and materials may be used in place thereof. The pulley 18 is driven slowly and continuously by means of a variable speed electric motor 24, speed reducing mechanism 26, pinion 28, and large gear 30 fixed to pulley 18. The apparatus is preferably constructed so as to obtain a wide variation in the speed of travel of the belt. The pulley 20 which is of the same diameter as pulley 18 is rotated in synchronized relation with pulley 18, by means of sprocket 32 fixed to the pulley shaft 34, chain 36, and sprocket 38 fixed to a shaft 40 on which is fixed the pulley 20. The belt is held in tight engagement with the pulleys 18 and 20 by means of rollers 42 and 44, biased toward the pulleys by means of springs 46 and 48, respectively, and arms 50 and 52. An idler pulley 54 is provided adjacent the pulley 20, over which the belt passes on its return to the forward end of the machine. Rollers 42 and 44 and idler pulley 54 also preferably have suitable friction surfaces such as the corrugated rubber 22 of pulleys 18 and 20. On its return the belt is twisted as shown and is thus reversed so that first one side and then the other carries the metal powder in its passage through the furnace and cooling portions of the device.

After the powder is spread onto the belt it passes into the entrance end of a suitable muffle type furnace 58, the belt with the powder thereon being supported at this point by means of the shelf portion 60 of a muffle 62 forming a passage for the belt. The muffle is formed of metal or other material impervious to gases. Preferably an adjustable roller 61 contacts the upper surface of the belt at a point just to the left of where the thin layer of powder is spread on the belt. An inclined portion 64 closely adjacent the powder on the belt acts to close the entrance end of the muffle as much as possible. The floor of the muffle preferably has a thin metallic cleanout plate (not shown) extending over the width of the muffle over which the belt passes. This may be removed after the device has been in operation for a time to remove any powder particles that may have been shaken from the belt and have become sintered to each other and to the cleanout plate. The sintered material may be scraped from the cleanout plate and the cleanout plate reused, or it may be replaced with a new one. The furnace is heated in any suitable manner. In the form illustrated, electric resistance heating elements 66 are used. Near the discharge end of the furnace is a suitable baffle 68 extending above the belt. Wet decarburizing gas is admitted through pipe 70 and the baffle causes it to pass from a point adjacent the rear of the furnace toward the entrance end of the furnace. The purpose of the baffle is to cause the wet gas to be brought into proximity with the powder in the furnace uniformly at a point at which the powder is at the maximum temperature. Dry decarburizing gas is admitted through pipe 72 and it passes above the powder on the belt as it is being cooled and passes into the furnace where it mixes with the wet gas. The dry gas prevents the decarburized powder from becoming oxidized as it is cooling and as it mixes with the moist gas in the furnace it assists in the decarburization and passes toward the entrance end of the muffle.

For cooling the powder there is provided a water chamber 74 surrounding the belt and powder thereon, cooling water being fed to the chamber by means of pipe 76 and being discharged therefrom by the pipe 78. A rubber or equivalent seal 80 prevents gases from escaping as the belt and decarburized and cooled powder passes into a chamber 82. The pulley 20 is within the chamber and mounted above the pulley is a rotary wire brush 84 driven by an electric motor 86. The purpose of the wire brush is to brush the powder from the belt. During its passage through the furnace the metal powder particles have become lightly sintered to each other and to the metal belt, and the revolving wire brush breaks the sinter and removes the material in powder form. Without the wire brush or its equivalent the lightly sintered material would be removed in lumps, thus necessitating a further operation to reduce it to powder. The decarburized powder after being brushed from the belt is discharged at the discharge end 88. A sponge rubber seal 90 is provided to prevent the flying powder particles in chamber 82 from escaping at the point where the belt passes therein. In the chamber 82 is a light bulb 92. By means of the light and a transparent window 94 conditions in the chamber can be observed by the operator.

In using the apparatus to remove carbon from iron powder furnace temperature of about 1400° F. to about 2000° F. have been used. A wide variety of metallic powders containing carbon have been decarburized successfully utilizing the described apparatus. In general, it is contemplated that any powder material that can be decarburized may be treated by the present device. Depending on the product desired, the apparatus may be used to produce iron powder that is partially or completely decarburized. Iron powder has been produced by decarburizing both white cast iron and steel powder. Mixtures of powdered mill scale and powdered cast iron or steel have been successfully processed in the apparatus to form a comparatively pure iron powder free of oxide and undesirable amounts of carbon.

The following is the approximate composition of one decarburizing gas that has been used successfully in decarburizing iron powder particles:

| | Percent |
|---|---|
| Carbon dioxide | 5 |
| Carbon monoxide | 10 |
| Hydrogen | 13 |
| Nitrogen | Balance |

Gas of the described analysis may be admitted to the cooling end of the apparatus through pipe 72 as described, while gas of the same analysis may be passed through a suitable humidifier, such as a steam or water humidifier, to take on the required moisture and the wet gas will then pass into the furnace through the pipe 70.

The rate of travel of the metallic belt and powder thereon depend on the characteristics of the material being processed, the temperature in the muffle, the thickness of the powder on the belt, and the decarburizing characteristics of the furnace atmosphere, as well as other factors. The furnace is preferably of such size and capacity as to bring the powder to the desired decarburizing temperature at a point at or immediately before the point where the baffle permits the wet decarburizing gas to first come in contact with the powder.

In one size of apparatus in accordance with the invention with a belt width of about 3½ inches, powder thicknesses of from about $\frac{1}{16}$" to about ¼" or more have been decarburized with little, if any, variation in carbon content from the top to the bottom of the layer, utilizing furnace temperatures and decarburizing mediums as described above. The belt speed of this apparatus is adjustable from about three feet per hour up to speeds of about 100 feet per hour.

After leaving the furnace the decarburized material is cooled under non-oxidizing conditions. The decarburized material is cooled sufficiently that when it is exposed to the atmosphere when passing beyond seal 80 practically no oxidization occurs. Preferably a hood and pipe (not shown) lead from above the belt at a point just beyond the seal 80 to a point outside the room in which the machine is located and a similar hood and pipe (not shown) lead from a point closely adjacent the point where the belt enters the furnace. Gases are thus prevented from escaping into the room in which the device is being operated.

Various changes and modifications of the embodiment of our invention disclosed herein may be made by those skilled in the art without departing from the principles of our invention.

We claim:

1. In an apparatus for decarburizing metal powders, a hopper for the powder, an endless metal conveyor belt, means for feeding the powder from the hopper and spreading it in a thin layer on the belt, a heated muffle adjacent said hopper and feeding means through which said belt passes, a passage leading from the muffle, a cooling means around the passage, a plurality of positively driven pulleys engaging said conveyor belt for continuously moving the conveyor belt and thin layer of powder thereon through the muffle and passage, means for directing a moist decarburizing gas into the furnace and toward the entrance thereof, means for causing a dry non-oxidizing gas to travel through the passage and into the furnace and toward the entrance thereof, and a rotary brush adjacent the exit end of the passage for removing the decarburized material from the belt in powder form.

2. A continuous process of decarburizing iron powder containing carbon chemically combined therewith which comprises placing a thin and continuous layer of the powder on a support and continuously moving the support with the powder thereon through a heated decarburizing zone under conditions whereby the powder becomes decarburized and the powder particles become lightly sintered to each other and to the support, cooling the lightly sintered material and support under non-oxidizing conditions, and thereafter removing the lightly sintered material from the support in powder form.

3. A process of decarburizing iron powder containing carbon chemically combined therewith which comprises, placing a thin and continuous layer of the powder on a support, moving the support with the powder thereon through a heated decarburizing zone under conditions to decarburize the powder particles and to lightly sinter the powder particles to each other and to the support, cooling the lightly sintered material and support under non-oxidizing conditions, and thereafter removing the lightly sintered material from the support.

4. A continuous process of decarburizing iron powder containing carbon combined therewith which comprises placing a thin and continuous layer of said powder on a support and continuously moving the support with the powder thereon through a zone heated to 1400° F. to about 2000° F. and containing a moist decarburizing gas whereby the thin layer of powder becomes decarburized and lightly sintered to the support, moving said support and decarburized powder through a cooling zone having a non-oxidizing atmosphere therein whereby the decarburized material is cooled without becoming oxidized, and thereafter breaking up the lightly sintered material into powdered form as it is removed from the support.

5. In an apparatus for decarburizing metal powders, a furnace having an entrance and an exit, an endless imperforate metal conveyor belt passing through said furnace, means adjacent the entrance end of said furnace for spreading a thin and continuous layer of powder onto the belt, means for supplying a decarburizing gas to the furnace at a point adjacent the exit thereof and for directing the decarburizing gas toward the entrance of the furnace to decarburize the powder while in the furnace on said belt and cause the powder particles to become lightly sintered to each other and to the belt, means for cooling the belt and the decarburized material thereon under non-oxidizing conditions after the belt and decarburized material have passed through said furnace, a plurality of positively driven pulleys engaging said endless and imperforate conveyor belt for continuously moving the said belt and the thin and continuous layer of material thereon through the furnace and thereafter through the said cooling means, and a rotary wire brush for removing the decarburized and lightly sintered material from the belt in powdered form after the belt and material thereon have passed through said cooling means.

6. In an apparatus for decarburizing powdered iron containing carbon combined therewith, a furnace having an entrance and an exit, a passage leading from said exit, means for cooling said passage, an endless imperforate metal conveyor belt traveling through said furnace and through said passage, means for spreading a thin and continuous layer of powdered iron containing carbon combined therewith onto said belt, means adjacent the exit end of the furnace for directing a moist decarburizing gas into said furnace and towards the entrance thereof, means for causing a dry non-oxidizing gas to travel through the passage into the furnace and towards the entrance thereof, said thin and continuous layer of powder being decarburized and lightly sintered to the metal belt while in said furnace and being cooled while passing through said passage, and a rotary means adjacent the exit end of said passage for removing decarburized and lightly sintered material from the belt in the form of powder after the belt and material thereon have been cooled.

7. A process of treating powder material comprising a metal and carbon combined therewith which comprises, placing a thin and continuous layer of the powder on a belt, continuously moving the belt and the thin and continuous layer of powder thereon through a heated and moist decarburizing zone under conditions whereby the powder particles become decarburized and lightly sintered to each other and to the moving belt, cooling said lightly sintered and decarburized material under non-oxidizing conditions, and simultaneously removing from the belt and breaking up the decarburized and lightly sintered material into powdered form after it is thus cooled.

8. A continuous process of decarburizing powdered material including iron and carbon chemically combined therewith which comprises, placing a thin and continuous layer of the powder on an endless conveyor belt, continuously moving the belt and the thin and continuous layer of powder thereon through a furnace heated to a temperature of 1400° to 2000° F., directing moist decarburizing gas into the furnace and causing it to flow in a direction opposite to the direction of movement of the layer of powder, the conditions in the furnace being such that the powder particles in the thin and continuous layer of powder become decarburized and lightly sintered to one another and to the belt, cooling the belt and sintered layer thereon under non-oxidizing conditions after they have passed through the furnace, and simultaneously and continuously removing from the belt and breaking up into powder the cooled layer of decarburized and sintered material.

ROBERT H. TERRY.
DONALD J. HENRY.